United States Patent
Everhart et al.

(10) Patent No.: US 8,862,318 B2
(45) Date of Patent: Oct. 14, 2014

(54) METHOD FOR TEACHING AN AFTERMARKET ACCESSORY COMPONENT, AND AN AFTERMARKET ACCESSORY COMPONENT CONFIGURED TO LEARN

(71) Applicant: General Motors LLC, Detroit, MI (US)

(72) Inventors: Charles A. Everhart, Canton, MI (US); Lawrence D. Cepuran, Northville, MI (US); Mark S. Frye, Grosse Pointe Woods, MI (US); Steven Swanson, Commerce Township, MI (US)

(73) Assignee: General Motors LLC, Detroit, MI (US)

( * ) Notice: Subject to any disclaimer, the term of this patent is extended or adjusted under 35 U.S.C. 154(b) by 150 days.

(21) Appl. No.: 13/654,232

(22) Filed: Oct. 17, 2012

(65) Prior Publication Data

US 2014/0108306 A1   Apr. 17, 2014

(51) Int. Cl.
*G06F 15/18*   (2006.01)

(52) U.S. Cl.
CPC ..................................... *G06F 15/18* (2013.01)
USPC .......................................... 701/36; 701/34.4

(58) Field of Classification Search
None
See application file for complete search history.

(56) References Cited

U.S. PATENT DOCUMENTS

| | | | |
|---|---|---|---|
| 5,719,551 A * | 2/1998 | Flick | 340/426.25 |
| 7,737,831 B2 * | 6/2010 | Munoz | 340/426.35 |
| 8,527,485 B2 * | 9/2013 | Marzani et al. | 707/705 |
| 2001/0029415 A1 * | 10/2001 | Flick | 701/36 |
| 2005/0222720 A1 * | 10/2005 | Flick | 701/2 |
| 2008/0238642 A1 * | 10/2008 | Mauti | 340/438 |
| 2011/0046788 A1 * | 2/2011 | Daly et al. | 700/275 |
| 2011/0295463 A1 * | 12/2011 | Daly et al. | 701/36 |
| 2012/0041640 A1 | 2/2012 | Videtich et al. | |
| 2012/0083970 A1 | 4/2012 | Owens et al. | |

OTHER PUBLICATIONS

Frye, Mark S., et al, Vehicle Interior Component for Supporting a Communication System, U.S. Appl. No. 13/430,406, filed Mar. 26, 2012.

* cited by examiner

*Primary Examiner* — Michael J Zanelli
(74) *Attorney, Agent, or Firm* — Ingrassia Fisher & Lorenz, P.C.

(57) ABSTRACT

A method for teaching an aftermarket accessory component how to actuate a vehicle function is disclosed herein. The aftermarket accessory component is configured to monitor communications across a vehicle bus. The method includes, but is not limited to, sampling message traffic transmitted across the vehicle bus while the vehicle function is not actuated. The method further includes setting filters in the aftermarket accessory component based on the sampled message traffic. The method further includes prompting a user to actuate the vehicle function in a first manner. The method further includes collecting filtered message traffic from the vehicle bus while the vehicle function is actuated in the first manner. The method further includes parsing the filtered message traffic to identify a command associated with actuation of the vehicle function. The method further includes testing the command to confirm that the command actuates the vehicle function.

20 Claims, 2 Drawing Sheets

METHOD FOR TEACHING AN AFTERMARKET ACCESSORY COMPONENT, AND AN AFTERMARKET ACCESSORY COMPONENT CONFIGURED TO LEARN

TECHNICAL FIELD

The technical field generally relates to vehicles, and more particularly relates to a method for teaching an aftermarket accessory component how to actuate a vehicle function, and further relates to an aftermarket accessory component configured to learn how to actuate a vehicle function.

BACKGROUND

Various accessory components are currently available in the marketplace for use with, or in conjunction with operation of, a vehicle. One exemplary accessory component is a telematics unit that is configured to provide a driver of a vehicle with telematics services (e.g., unlocking vehicle doors, collision detection, navigation assistance, etc. . . . ) Some of the services that can be provided by an accessory component may require the accessory component to transmit a command across the vehicle's communication bus (hereinafter, "vehicle bus"). For example, an accessory component that is configured to unlock a vehicle's door when the driver is locked out of his or her vehicle will need to send a command to the vehicle's body control module instructing the body control module to unlock the door.

The control systems for each make and model of vehicle in the market place require the transmission of a unique command to accomplish each vehicle function such as a door unlock function. As a result, a door unlock command transmitted over the vehicle bus of a first vehicle that was manufactured by a first original equipment manufacturer (OEM) will not be effective to unlock the vehicle door of a second vehicle manufactured by a second OEM. This is not problematic when the accessory component is embedded into the vehicle by the OEM during vehicle assembly because each OEM is aware of its own unique commands for each vehicle function.

However, aftermarket accessory components (i.e., accessory components that are not assembled to the vehicle during vehicle assembly by the OEM and/or accessory components that are sold directly to the consumer in a separate sales transaction) that are configured to provide services that require the transmission of a command across a vehicle bus face a challenge arising out of the uniqueness of each command that is needed to actuate each vehicle function. To obtain each unique command for each vehicle function for each vehicle model for each model year for each OEM can be a laborious, time consuming, and expensive task.

Accordingly, it is desirable to provide a method for teaching an aftermarket accessory component how to actuate a vehicle function without assembling a database of unique commands for each vehicle function for each vehicle model for each model year for each OEM. In addition, it is desirable to provide an aftermarket accessory component that is configured to learn how to actuate a vehicle function without having access to such a database. Furthermore, other desirable features and characteristics will become apparent from the subsequent detailed description and the appended claims, taken in conjunction with the accompanying drawings and the foregoing technical field and background.

SUMMARY

Various non-limiting examples of a method for teaching an aftermarket accessory component that is configured to monitor communications across a vehicle bus to actuate a vehicle function, and various non-limiting examples of an aftermarket accessory component configured for use with a vehicle having a vehicle bus are disclosed herein.

In a first, non-limiting example, the method includes, but is not limited to, sampling, with the aftermarket accessory component, message traffic transmitted across the vehicle bus while the vehicle function is not actuated. The method further includes, but is not limited to, setting filters in the aftermarket accessory component based on the sampled message traffic. The method further includes, but is not limited to, prompting a user with the aftermarket accessory component to actuate the vehicle function in a first manner. The method further includes, but is not limited to, collecting, with the aftermarket accessory component, filtered message traffic from the vehicle bus while the vehicle function is actuated in the first manner. The method still further includes, but is not limited to, parsing, with the aftermarket accessory component, the filtered message traffic to identify a command associated with actuation of the vehicle function.

In another non-limiting example, the method includes, but is not limited to, sampling, with the aftermarket accessory component, message traffic transmitted across the vehicle bus while the vehicle function is not actuated. The method further includes, but is not limited to, setting filters in the aftermarket accessory component based on the sampled message traffic. The method further includes, but is not limited to, prompting a user with the aftermarket accessory component to actuate the vehicle function in a first manner. The method further includes, but is not limited to, collecting, with the aftermarket accessory component, filtered message traffic from the vehicle bus while the vehicle function is actuated in the first manner. The method still further includes, but is not limited to, parsing, with the aftermarket accessory component, the filtered message traffic to identify a first plurality of candidate commands that may be associated with actuation of the vehicle function.

In another non-limiting example, the aftermarket accessory component includes, but is not limited to, a housing. The aftermarket accessory component further includes, but is not limited to, a processor that is mounted within the housing. The processor is configured to be communicatively coupled with the vehicle bus. The aftermarket accessory component further includes, but is not limited to, an electronic memory unit that is mounted within the housing and that is communicatively coupled with the processor. The aftermarket accessory component further includes, but is not limited to, a user input component that is mounted to the housing and that is communicatively coupled with the processor. The aftermarket accessory component still further includes, but is not limited to, an output component that is mounted to the housing and that is communicatively coupled with the processor. The processor and the electronic memory unit are configured to cooperate to sample message traffic transmitted across the vehicle bus when a vehicle function is not actuated, to set filters based on the sampled message traffic, to instruct the output component to prompt a user to actuate the vehicle component in a first manner, to collect filtered message traffic from the vehicle bus while the vehicle function is actuated in the first manner, and to parse the filtered message traffic to identify a command associated with the actuation of the vehicle function.

DESCRIPTION OF THE DRAWINGS

The examples disclosed herein will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

A method for teaching an aftermarket accessory component how to actuate a vehicle function without relying on a pre-existing database of unique commands and an aftermarket accessory component that is configured to execute such a method are disclosed herein. The aftermarket accessory component is configured to monitor communications across a vehicle bus and is further configured to operate in a learning mode. While operating in the learning mode, the aftermarket accessory component can be "taught" the unique commands that will be needed to actuate the desired vehicle functions for the specific vehicle that the aftermarket accessory component is mounted in. While in the learning mode, the accessory component will monitor message traffic across the vehicle bus. During this monitoring period, a user will actuate the desired vehicle function using the actuation mechanism provided by the vehicle (e.g., depressing a door unlock button). The actuation mechanism will cause a command to be transmitted across the vehicle bus that will actuate the desired function. This command will be detected and recorded by the accessory component and associated with the desired function. The accessory component will thereafter be able to actuate the function by transmitting the learned command across the vehicle bus.

A greater understanding of the methods for teaching an aftermarket accessory component how to actuate a vehicle function, and a greater understanding of the aftermarket accessory component configured for use with a vehicle may be obtained through a review of the illustrations accompanying this application together with a review of the detailed description that follows.

Figure 1:
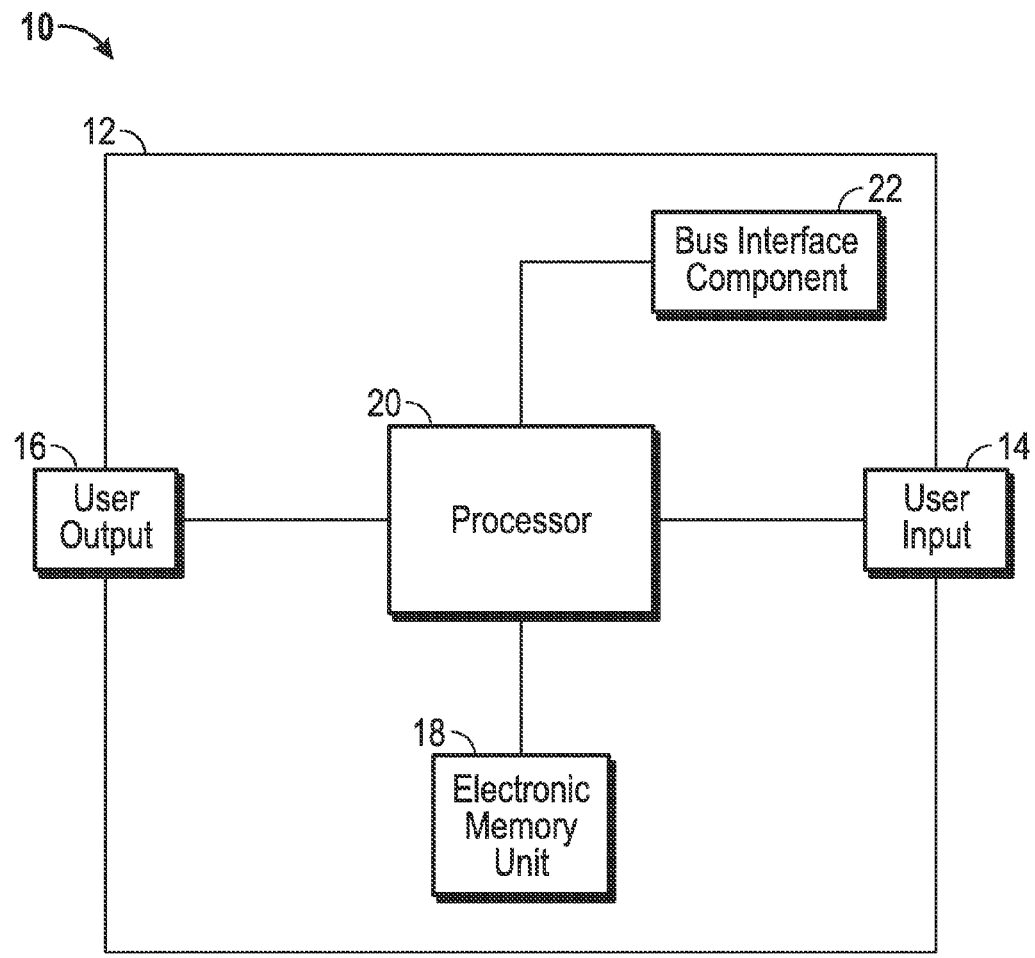
FIG. 1 is a schematic view illustrating a non-limiting example of an aftermarket accessory component made in accordance with the teachings of the present disclosure.

FIG. 1 is a schematic view illustrating a non-limiting example of an aftermarket accessory component 10. In some examples, aftermarket accessory component 10 may be an aftermarket telematics unit. Conventional aftermarket telematics units are disclosed in a pending U.S. patent application having the Ser. No. 12/787,472 filed on May 26, 2010, and also in U.S. Publication No. 2005/0273211 published on Dec. 8, 2005, each of which is hereby incorporated herein by reference in its entirety. It should be understood that the teachings disclosed herein are not limited to examples where aftermarket accessory component 10 comprises an aftermarket telematics unit. Rather, aftermarket accessory component 10 may comprise any type of component and/or device that may be positioned within a vehicle and that may need to transmit commands across the vehicle bus.

Aftermarket accessory component 10 includes, but is not limited to, a housing 12, a user input component 14, an output component 16, an electronic memory unit 18, a processor 20, and a vehicle bus interface component 22. In other examples, aftermarket accessory component 10 may include additional components.

Housing 12 may be any structure suitable for mounting/containing the other components of aftermarket accessory component 10. In some examples, housing 12 may be configured for mounting to a surface or to a component inside an interior of a vehicle.

User input component 14 may be any component suitable to receive inputs from an operator of aftermarket accessory component 10. For example, and without limitation, user input component 14 may be a button, a switch, a touch screen, a knob, a slide, a microphone, a camera, a motion detector, or any other device that is configured to permit a human to provide inputs into an electronic system.

Output component 16 may be any component suitable for communicating output to an operator of aftermarket accessory component 10. For example, and without limitation, output component 16 may be an illuminating component (e.g., incandescent bulb; light emitting diode), a sound emitting component (e.g., a speaker), a vibrating component (e.g., a vibrator), an image displaying component (e.g., a display screen), or any other type of component that is capable of communicating with an operator of aftermarket accessory component 10.

Electronic memory unit 18 may be any type of electronic memory device that is configured to store data. For example, and without limitation, electronic memory unit 18 may be any type volatile or non-volatile memory, flash drives, disk drives, tape drives, and mass storage devices and may include any suitable software, algorithms and/or sub-routines that provide the electronic memory device with the capability to store, organize, and permit the retrieval of data. Electronic memory unit 18 is configured to store at least instructions necessary to enable processor 20 to carry out the method described below.

Processor 20 may be any type of computer, computer system, circuitry, chipset or microprocessor that is configured to perform algorithms, to execute software applications, to execute sub-routines and/or to be loaded with and to execute any other type of computer program. Processor 20 may comprise a single processor or a plurality of processors acting in concert. Processor 20 is configured to communicate over the vehicle bus. Processor 20 is further configured to be switched into a learning mode wherein processor 20 can be taught to actuate a vehicle function. The process by which processor 20 can be taught to actuate a vehicle function will be discussed in detail below.

Vehicle bus interface component 22 may comprise any component that is configured to facilitate communications between processor 20 and a vehicle bus of the vehicle in which aftermarket accessory component 10 is installed. In some examples, vehicle bus interface component 22 may be a USB port, a telephone jack, a docking station, an electrical connector or any other type of mechanism that is configured to mechanically couple aftermarket accessory component 10 with a lead or wire carrying signals from the vehicle's bus to aftermarket accessory component 10. In other examples, vehicle bus interface component 22 may comprise a wireless transmitter, a wireless receiver, and/or a wireless transceiver that is configured to wirelessly couple vehicle bus interface component 22 with the vehicle's bus.

In the illustrated example, processor 20 is communicatively coupled with user input component 14, with output component 16, with electronic memory unit 18, and with vehicle bus interface component 22. Such communicative coupling may be accomplished via a wired or a wireless connection. While the illustrated example depicts a direct, wired connection between processor 20 and each of the other components, it should be understood that in other examples, other coupling arrangements such as, but not limited to, a bus arrangement, may be employed without departing from the teachings of the present disclosure. Processor 20 is configured to receive communications from, and to transmit communications to each of these components via the communicative coupling. For example, a user input imparted to user input component 14 may be converted to an electronic signal and communicated to processor 20 for further action. In another example, processor 20 may transmit an electronic signal to output component 16 that causes output component 16 to emit an audible sound, to illuminate a light, to display text or graphics, or to otherwise communicate with a user of aftermarket accessory component 10.

Processor 20 is further configured to communicate with electronic memory unit 18 to retrieve appropriate instructions in response to receiving various user inputs. In this manner, processor 20 and electronic memory unit 18 are configured to cooperate to carry out the method discussed below.

Figure 2:
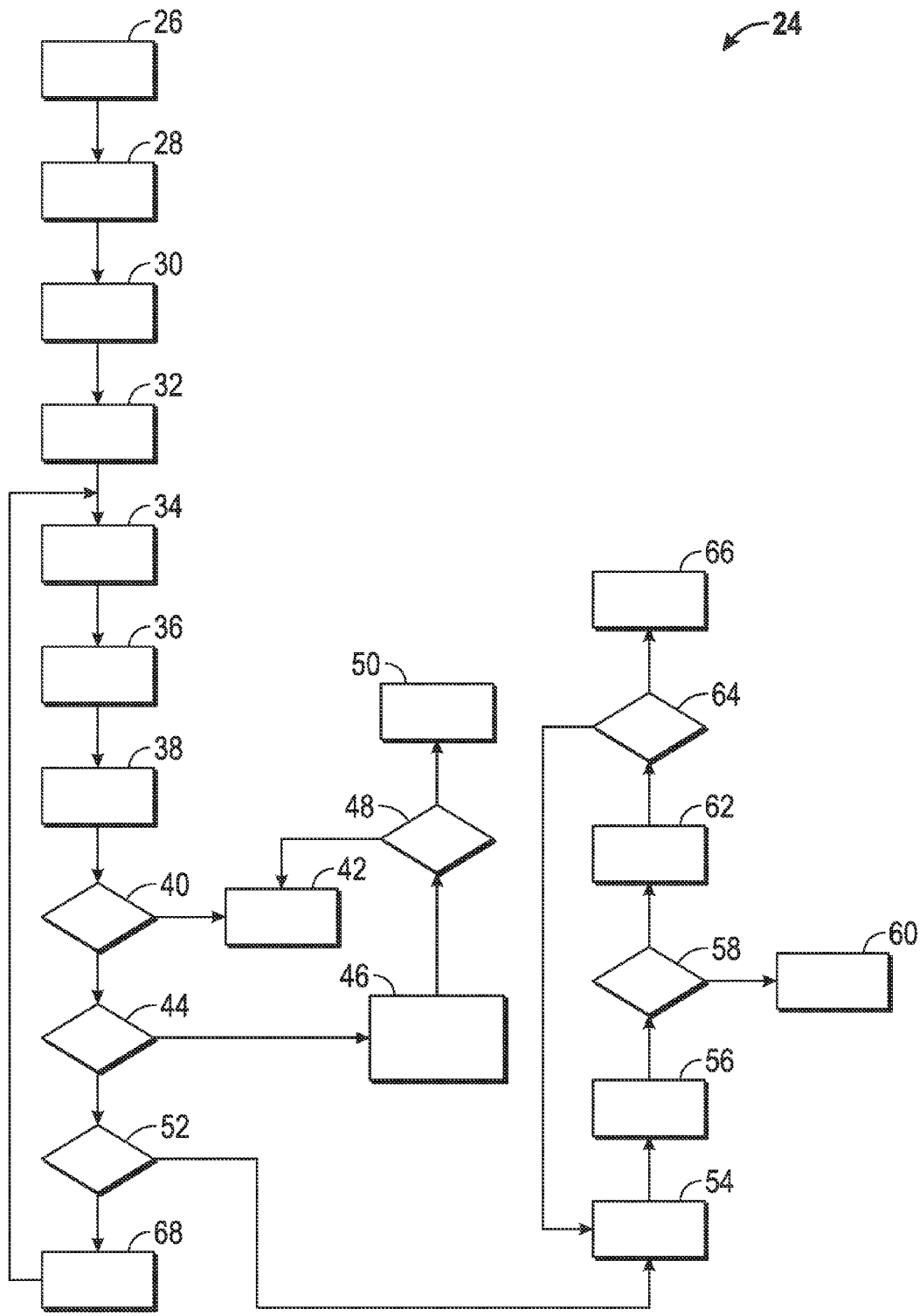
FIG. 2 is a flow chart illustrating a non-limiting example of a method for teaching an aftermarket accessory component how to actuate a vehicle function in accordance with the teachings of the present disclosure.

FIG. 2 is a flow chart illustrating an example of a method 24 for teaching an aftermarket accessory component how to actuate a vehicle function. With continuing reference to FIG. 1, the aftermarket accessory component may be aftermarket accessory component 10 or it may be any other type of aftermarket accessory component that is configured to monitor communications across a vehicle bus.

At step 26, method 24 begins. In some examples, as an initial condition, the vehicle's engine and ignition are each switched off. This will minimize the amount of message traffic being transmitted across the vehicle bus by the various vehicle components. In other examples, method 24 can be performed by an aftermarket accessory component while either or both the engine and the ignition are switched on.

At step 28, the aftermarket accessory component is switched into a learning mode by a user. While in the learning mode, the aftermarket accessory component can be taught how to actuate a vehicle function. In some examples, the aftermarket accessory component may receive an input from the user that switches the aftermarket accessory component into the learning mode. For example, with respect to aftermarket accessory component 10, a user may deliver an input to processor 20 via user input component 14 that commands processor 20 to enter the learning mode.

At step 30, the aftermarket accessory component samples the network message traffic across the vehicle bus. When doing so, the aftermarket accessory component will detect all message traffic being transmitted across the vehicle bus during the sampling period. With respect to aftermarket accessory component 10, this may be accomplished by processor 20 sending appropriate commands to vehicle bus interface component 22 that enables processor 20 to monitor the vehicle's bus.

At step 32, the aftermarket accessory component will set initial network message filters based on the sampled network message traffic. With respect to aftermarket accessory component 10, at this step, processor 20 will issue commands to electronic memory unit 18 that causes electronic memory unit 18 to record information indicative of each message that was detected during the sampling step. This recorded information will be used subsequently by processor 20 to filter out irrelevant messages during a later step of method 24.

At step 34, the aftermarket accessory component will prompt a user to actuate the vehicle function that the user wants the aftermarket accessory component to learn how to actuate. The aftermarket accessory component will prompt the user to actuate the vehicle function by using an output device. With respect to aftermarket accessory component 10, processor 20 would send a command to output component 16 to transmit a predetermined signal to the user. For example, an audible signal may be emitted or a light emitting component may be illuminated or a text message or a graphic message may be displayed to the user. The aftermarket accessory component may be configured to monitor the network message traffic across the vehicle bus for a predetermined period of time after providing the prompt.

In response to receiving the prompt from the aftermarket accessory component, the user will then actuate the vehicle function that the user wishes to teach the aftermarket accessory component to actuate. For example, if the user desires to teach the aftermarket accessory component how to unlock the vehicle's doors, then the user would actuate the vehicle's door locks in response to the prompt. When the user actuates the actuator for the desired vehicle function, the actuator will send a command across the vehicle bus that will cause actuation of the vehicle function.

In some examples, the aftermarket accessory component may prompt the user to actuate the vehicle function in a predetermined manner. For example, the user may be prompted to actuate the vehicle function a predetermined number times (e.g., three times) within the predetermined period of time (e.g., five seconds). This will be helpful in later steps of method 24 to enable the aftermarket accessory component to search for a message transmitted across the vehicle bus in a manner that corresponds with the predetermined manner of actuation. For example, in an example where the user is prompted to press the door unlock actuator of the vehicle three times within a five second period, the aftermarket accessory component will then look for a command transmitted across the vehicle bus three times during that five second window.

At step 36, the aftermarket accessory component monitors network message traffic to collect filtered network message traffic. The aftermarket accessory component will use the previously detected network messages that were stored in the aftermarket accessory component's electronic memory unit during step 32 to filter out the messages that are transmitted across the vehicle's bus during step 36. This filtration will yield new messages (i.e., filtered network messages) that were not transmitted across the vehicle bus during the sampling that occurred at step 30. So long as the user actuated the vehicle function during the predetermined period of time, the actuation command necessary to actuate the desired vehicle function will be included in the filtered network message traffic that is detected by the aftermarket accessory component during step 36.

At step 38, the aftermarket accessory component will parse through the filtered network message traffic in an attempt to determine, if possible, which detected message corresponds with actuation of the desired vehicle function. At this step, four outcomes are possible. There could be (1) zero filtered network messages; (2) one filtered network message; (3) less than a predetermined number of filtered network messages; or (4) a number of messages that are equal to, or greater than, the predetermined number of messages.

At step 40, the scenario where there are zero filtered network messages is addressed. If it is determined that there are zero filtered network messages remaining, then the method proceeds to step 42 which is failure. In some examples, the process may begin anew or the process may return to step 34 with the user being prompted to actuate the desired vehicle function in a manner that differs from the manner in which it was actuated earlier, with the rest of the steps of method 24 following suit.

At step 44, the scenario where there is only one filtered network message is addressed. If it is determined that there is only one filtered network message remaining, then the aftermarket accessory component will conclude that that filtered network message is the command that actuates the desired vehicle function and method 24 progresses to step 46.

At step 46, the aftermarket accessory component will verify that the one filtered network message actuates the desired vehicle function. This is accomplished by the aftermarket accessory component transmitting the one filtered network message as a command across the vehicle bus.

From step 46, method 24 progresses to step 48 where the aftermarket accessory component receives user feedback indicative of success or failure. The user may provide such feedback using the user input component. If the vehicle function is properly actuated, then the user can provide an input into the aftermarket accessory component indicating that the command actuates the vehicle function. In that case, method 24 ends at step 50 where the aftermarket accessory component may automatically switch out of learning mode.

If, at step 48, the user provides an input that indicates that the vehicle function was not properly actuated, then method 24 ends at step 42, which is associated with failure. In some examples, method 24 may return to step 34 where the user may be prompted to, once again, actuate the vehicle function, but in a manner that differs from the earlier actuation.

At step 52, the scenario where there are less than a predetermined number of filtered network messages is addressed. In some examples, the predetermined number of messages may be three messages, four messages, or any other desirable number of messages. If the number of filtered network messages is less than the predetermined number of messages, then method 24 progresses to step 54.

At step 54, a first message of the filtered network messages is selected for further evaluation. In some examples, the first message may be selected randomly or through the execution of an algorithm configured to rank order the filtered network messages in a ranking that correlates to a likelihood that such message will actuate the vehicle function. In other examples, the aftermarket accessory component may prompt the user to select the first message from a list of candidate messages (i.e., the filtered network messages).

At step 56, the first message is tested to confirm that it is the command that will actuate the vehicle function. This is accomplished by the aftermarket accessory component transmitting the first message as a command over the vehicle bus.

At step 58, it is determined whether the first message was successful in actuating the vehicle function. This may be accomplished by obtaining input from the user indicative of success or failure. In some examples the aftermarket accessory component may prompt the user to provide such input. If the user's input indicates that the first message was successful in actuating the vehicle function, then method 24 progresses to step 60 where the aftermarket accessory component may automatically switch out of learning mode.

If, however, the user's input indicates that the first message was unsuccessful in actuating the vehicle function, the method progresses to step 62. At step 62, the aftermarket accessory component may be configured to decrement a message counter to reflect that the number of remaining filtered network messages has diminished by one. From there, method 24 progresses to step 64 where it is ascertained whether the number of remaining filtered network messages is equal to zero. If the number of remaining filtered network messages equals zero, then method 24 ends at step 66, which is associated with failure. In some examples, the aftermarket accessory component may be configured to return to step 34 and prompt the user to actuate the desired vehicle function in a manner that differs from the previous manner of actuation.

If the number of remaining network messages is greater than zero, then method 24 returns to step 54 to select the next message from the list of remaining filtered network messages and steps 56 through 64 are repeated until the number of remaining filtered network messages is equal to zero.

Returning now to step 52, if the number of filtered network messages is equal to or greater than the predetermined number of messages, then method 24 progresses to step 68. At step 68, the aftermarket accessory component is configured to update the network message filters. This may be accomplished by adding to the current network filters all those additional messages which were collected by the aftermarket accessory component at step 36 and which were eliminated from consideration as being the command which actuates the desired vehicle function. In some examples, this may be accomplished by eliminating any messages that were not filtered out by the original filtration process, but which do not comport with the manner in which the user was prompted to actuate the desired vehicle function. For example, if the user was prompted to actuate the desired vehicle function three times during the predetermined period of time, then any message which was collected at step 36 but which was not detected three times within the predetermined period of time can be excluded from further consideration. Such messages would, at step 68, be added to the network message filters.

After the network message filters have been updated, method 24 returns to step 34 for another iteration of prompting (step 34), collecting (step 36) and parsing (step 38). However, at this second pass through these method steps, and for each subsequent pass through these method steps, at step 34, the aftermarket accessory component will prompt the user to actuate the desired vehicle function in a new and/or unique manner. For example, if during the first pass through step 34, the user was prompted to actuate the desired vehicle feature three times, then on each subsequent pass through step 34, the user may be asked to actuate the desired vehicle feature an additional number of times or a number of times that corresponds with the number of times that step 34 has been performed. Method steps 34 through 68 will thereafter be repeated until either the correct command has been ascertained or until some failure condition has been met, at which time the method terminates. Such repeat iteration(s) of method steps 34-68 may be referred to herein as "further teaching".

While at least one embodiment has been presented in the foregoing detailed description, it should be appreciated that a vast number of variations exist. It should also be appreciated that the example or examples are not intended to limit the scope, applicability, or configuration of the disclosure in any way. Rather, the foregoing detailed description will provide those skilled in the art with a convenient road map for implementing the examples. It should be understood that various changes can be made in the function and arrangement of elements without departing from the scope of the disclosure as set forth in the appended claims and the legal equivalents thereof.

What is claimed is:

1. A method for teaching an aftermarket accessory component to actuate a vehicle function, the aftermarket accessory component being configured to monitor communications across a vehicle bus, the method comprising:
   sampling, with the aftermarket accessory component, message traffic transmitted across the vehicle bus while the vehicle function is not actuated;
   setting filters in the aftermarket accessory component based on the sampled message traffic;

prompting a user with the aftermarket accessory component to actuate the vehicle function in a first manner;
collecting, with the aftermarket accessory component, filtered message traffic from the vehicle bus while the vehicle function is actuated in the first manner; and
parsing, with the aftermarket accessory component, the filtered message traffic to identify a command associated with actuation of the vehicle function.

2. The method of claim 1, further comprising testing, with the aftermarket accessory component, the command to confirm that the command actuates the vehicle function.

3. The method of claim 2, wherein testing, with the aftermarket accessory component, the command to confirm that the command actuates the vehicle function comprises transmitting the command over the vehicle bus and receiving a confirming input from the user to confirm that the vehicle function was actuated.

4. The method of claim 1, wherein the sampling, with the aftermarket accessory component, message traffic transmitted across the vehicle bus comprises sampling the message traffic while a vehicle engine is in an off state.

5. The method of claim 1, wherein the sampling, with the aftermarket accessory component, message traffic transmitted across the vehicle bus comprises sampling the message traffic while a vehicle ignition is in an off state.

6. The method of claim 1, wherein prompting the user with the aftermarket accessory component to actuate the vehicle function in the first manner comprises prompting the user to actuate the vehicle function a predetermined number of times within a predetermined amount of time.

7. A method for teaching an aftermarket accessory component how to actuate a vehicle function, the aftermarket accessory component being configured to monitor communications across a vehicle bus, the method comprising:
sampling, with the aftermarket accessory component, message traffic transmitted across the vehicle bus while the vehicle function is not actuated;
setting filters in the aftermarket accessory component based on the sampled message traffic;
prompting a user with the aftermarket accessory component to actuate the vehicle function in a first manner;
collecting, with the aftermarket accessory component, filtered message traffic from the vehicle bus while the vehicle function is actuated in the first manner; and
parsing, with the aftermarket accessory component, the filtered message traffic to identify a first plurality of candidate commands that may be associated with actuation of the vehicle function.

8. The method of claim 7, further comprising testing, with the aftermarket accessory component, the first plurality of candidate commands to determine which candidate command actuates the vehicle function.

9. The method of claim 7, further comprising testing, with the aftermarket accessory component, the first plurality of candidate commands to determine which candidate command actuates the vehicle function when a number of the first plurality of candidate commands is less than a predetermined number of candidate commands.

10. The method of claim 9, further comprising conducting further teaching of the aftermarket accessory component when the number is equal to or greater than the predetermined number of candidate commands.

11. The method of claim 10, wherein further teaching comprises:
updating the filters in the aftermarket accessory component;
prompting the user with the aftermarket accessory component to actuate the vehicle function in a second manner;
collecting, with the aftermarket accessory component, filtered message traffic from the vehicle bus while the vehicle function is actuated in the second manner;
parsing, with the aftermarket accessory component, the filtered message traffic to identify a second plurality of candidate commands that may be associated with actuation of the vehicle function; and
testing, with the aftermarket accessory component, the second plurality of candidate commands to determine which candidate command actuates the vehicle function.

12. The method of claim 11, wherein updating the filters comprises updating the filters in the aftermarket accessory component to reflect any commands collected from the vehicle bus which are not consistent with the first manner of actuation.

13. The method of claim 11, wherein prompting the user to actuate the vehicle function in the first manner comprises prompting the user to actuate the vehicle function a first predetermined number of times, and wherein prompting the user to actuate the vehicle function in the second manner comprises prompting the user to actuate the vehicle function a second predetermined number of times.

14. The method of claim 7, wherein the sampling, with the aftermarket accessory component, message traffic transmitted across the vehicle bus comprises sampling the message traffic while a vehicle engine is in an off state.

15. The method of claim 7, wherein the sampling, with the aftermarket accessory component, message traffic transmitted across the vehicle bus comprises sampling the message traffic while a vehicle ignition is in an off state.

16. An aftermarket accessory component that is configured for use with a vehicle having a vehicle bus, the aftermarket accessory component comprising:
a housing;
a processor mounted within the housing, the processor configured to be communicatively coupled with the vehicle bus;
an electronic memory unit mounted within the housing and communicatively coupled with the processor;
a user input component mounted to the housing and communicatively coupled with the processor; and
an output component mounted to the housing and communicatively coupled with the processor,
wherein the processor and the electronic memory unit are configured to cooperate to sample message traffic transmitted across the vehicle bus when a vehicle function is not actuated, to set filters based on the sampled message traffic, to instruct the output component to prompt a user to actuate the vehicle function in a first manner, to collect filtered message traffic from the vehicle bus while the vehicle function is actuated in the first manner, and to parse the filtered message traffic to identify a command associated with actuation of the vehicle function.

17. The aftermarket accessory component of claim 16, wherein the processor and the electronic memory unit are further configured to cooperate to test the command to confirm that the command actuates the vehicle function.

18. The aftermarket accessory component of claim 16, wherein the processor and the electronic memory unit are further configured to cooperate to parse the filtered message traffic to identify a first plurality of candidate commands and to test the first plurality of candidate commands to determine which command actuates the vehicle function.

19. The aftermarket accessory component of claim 16, wherein the processor and the electronic memory unit are further configured to cooperate to parse the filtered message traffic to identify a first plurality of candidate commands associated with the actuation of the vehicle function and to test the first plurality of candidate commands to determine which command actuates the vehicle function when the first plurality of candidate commands is less than a predetermined number of commands.

20. The aftermarket accessory component of claim 19, wherein the processor and the electronic memory unit are further configured to cooperate to conduct further teaching when a number of the plurality of candidate commands in the first plurality of candidate commands is equal to or greater than the predetermined number of commands.

* * * * *